(12) United States Patent  
Otsubo

(10) Patent No.: US 10,558,056 B2  
(45) Date of Patent: Feb. 11, 2020

(54) STEREOSCOPIC IMAGE DISPLAY DEVICE AND STEREOSCOPIC IMAGE DISPLAY METHOD

(71) Applicant: Asukanet Company, Ltd., Hiroshima-shi, Hiroshima (JP)

(72) Inventor: Makoto Otsubo, Hiroshima (JP)

(73) Assignee: ASUKANET COMPANY, LTD., Hiroshima-shi (JP)

( * ) Notice: Subject to any disclaimer, the term of this patent is extended or adjusted under 35 U.S.C. 154(b) by 0 days.

(21) Appl. No.: 16/313,657

(22) PCT Filed: Jun. 16, 2017

(86) PCT No.: PCT/JP2017/022360  
§ 371 (c)(1),  
(2) Date: Dec. 27, 2018

(87) PCT Pub. No.: WO2018/003555  
PCT Pub. Date: Jan. 4, 2018

(65) Prior Publication Data  
US 2019/0317334 A1    Oct. 17, 2019

(30) Foreign Application Priority Data  
Jun. 28, 2016 (JP) .................. 2016-127416

(51) Int. Cl.  
*H04N 13/30* (2018.01)  
*H04N 13/302* (2018.01)  
(Continued)

(52) U.S. Cl.  
CPC ..... *G02B 27/2264* (2013.01); *G02B 27/2214* (2013.01); *G03B 35/18* (2013.01); *H04N 13/315* (2018.05); *H04N 13/354* (2018.05)

(58) Field of Classification Search  
None  
See application file for complete search history.

(56) References Cited

U.S. PATENT DOCUMENTS

2004/0130503 A1    7/2004 Hamagishi et al.

FOREIGN PATENT DOCUMENTS

| JP | 6-191838 A | 7/1993 |
| JP | 9-33858 A | 2/1997 |

(Continued)

OTHER PUBLICATIONS

International Search Report dated Sep. 5, 2017, issued in counterpart International Application No. PCT/JP2017/022360 (1 page).

(Continued)

*Primary Examiner* — Chikaodili E Anyikire  
(74) *Attorney, Agent, or Firm* — Westerman, Hattori, Daniels & Adrian, LLP

(57) ABSTRACT

A stereoscopic image display device (10) includes: a display (12) displaying small images (11) side by side, each of which containing three-dimensional display data, to convert the data into rays and output from the small images (11); first mechanical shutters (14) disposed, corresponding to positions of the small images (11), in front of the display (12), extracting the rays in a time-division manner as partial rays each output from a plurality of partial regions (13) provided in each of the small images (11) and transmitting the partial rays forward; and second mechanical shutters (16) disposed, corresponding to the positions of the small images (11), in front of the first mechanical shutters (14), transmitting forward the partial rays extracted in a time-division manner per each of the small images (11), reconstructing the partial rays as the rays, and converging each of the reconstructed rays in front to form a three-dimensional image.

10 Claims, 4 Drawing Sheets

(51) Int. Cl.
*G02B 27/22* (2018.01)
*H04N 13/315* (2018.01)
*H04N 13/354* (2018.01)
*G03B 35/18* (2006.01)

(56) References Cited

FOREIGN PATENT DOCUMENTS

| | | |
|---|---|---|
| JP | 9-101482 A | 4/1997 |
| JP | 2002-287089 A | 10/2002 |
| JP | 2003-50375 A | 2/2003 |
| JP | 4744743 B2 | 8/2011 |

OTHER PUBLICATIONS

Notification of Reasons for Refusal dated Sep. 25, 2018, issued in counterpart of Japanese Patent Application No. 2018-525059, with English Translation (4 pages).
Decision to Grant a Patent dated Dec. 4, 2018, issued in counterpart of Japanese Patent Application No. 2018-525059, with English Translation (6 pages).
Iwadate et al., "Overview of Three-Dimensional Image Technology" NHK STRL. R&D, 2014. 3, vol. 144, pp. 4-9 with English Translation, Cited in Specification. (10 pages).
Mishina "Overview of Integral Method" NHK STRL. R&D, 2014. 3, vol. 144, pp. 10-17, With English Translation. Cited in Specification. (15 pages).

STEREOSCOPIC IMAGE DISPLAY DEVICE AND STEREOSCOPIC IMAGE DISPLAY METHOD

TECHNICAL FIELD

The present invention is related to a stereoscopic image display device and a stereoscopic image display method that enable a stereoscopic image (a three-dimensional image) to be viewed with a similar feeling to everyday life without the use of special glasses.

BACKGROUND ART

Stereoscopic image display methods are roughly classified into a method employing a two-viewpoint system that realizes stereoscopic vision by reproducing binocular parallax and convergence, a method employing a multi-viewpoint system that presents, by using lenticular lenses or the like, to left and right eyes multi-view images that are laterally arrayed, and a method employing a spatial image reproducing system that forms a stereoscopic image in space by using data (images) that have recorded optical spatial images of an object (e.g. refer to Non Patent Literature 1). Of these methods, the method employing the spatial image reproducing system is regarded as an ideal stereoscopic image display method that satisfies all factors with which humans perceive stereoscopic effect based on their visual functions (e.g. refer to Non Patent Literature 2).

As a method employing the spatial image reproducing system for displaying a sharp stereoscopic image with a wide viewing angle, for example, in Patent Literature 1, a stereoscopic image display method in which a display control panel having a large number of minute light-transmission portions is provided, behind the display control panel, a group of image display panels, which includes a plurality of image display panels displaying a large number of small images of an object viewed from positions of the respective minute light-transmission portions, is disposed, the minute light-transmission portions are made to rapidly sequentially selectively allow light to pass through, and at the same time, the small images are displayed at positions on the image display panels corresponding to the minute light-transmission portions that have become to allow light to pass through, is suggested.

Also, for example, in Patent Literature 2, a three-dimensional stereoscopic image display device including: a plurality of image reproduction panels respectively displaying a plurality of group images, in each of which, a large number of small images to become a base of a stereoscopic image are displayed side by side at a same time in a state of not overlapping, and an object is viewed from positions substantially slightly different from each other; an image display panel sequentially displaying in a time-division manner the group images respectively displayed on the plurality of image reproduction panels; and a display control panel disposed in front of the image display panel, having a plurality of group minute light-transmission portions each opening and closing in synchronization with each of the small images of the group images displayed on the image display panel in a time-division manner, wherein the group minute light-transmission portions each have a large number of minute light-transmission portions each of which is in a pinhole-like state or a slit-like state, is suggested.

CITATION LIST

Patent Literature

Patent Literature 1: Japanese Unexamined Patent Application Publication No. H9-33858
Patent Literature 2: Japanese Patent No. 4744743

Non Patent Literature

Non Patent Literature 1: Y. Iwadate "Overview of Three-Dimensional Image Technology" NHK STRL. R&D, 2014.3, Vol. 144, pp. 4-9
Non Patent Literature 2: T. Mishina "Overview of Integral Method" NHK STRL. R&D, 2014.3, Vol. 144, pp. 10-17

SUMMARY OF INVENTION

Technical Problem

However, as to the stereoscopic image display method set forth in Patent Literature 1, to form a high-definition stereoscopic image, it is necessary to display a large number of the small images within an afterimage retention time of the eye. That is, the small images displayed on the image display panels need to be switched in a short period of time. However, there is a limitation on the image display switching speed of the image display panels, and thus, the group of image display panels including the plurality of image display panels is disposed behind the display control panel, and of the image display panels each displaying the small images in advance, the image display panels displaying the small images corresponding to the minute light-transmission portions, which have become to allow light to pass through, of the display control panel are selected.

Also, as to the three-dimensional stereoscopic image display device set forth in Patent Literature 2, as is the case in Patent Literature 1, the plurality of image reproduction panels each displaying the group images are disposed on the back side of the image display panel.

As a result, problems arise in which the back side of the display control panel increases in size for the stereoscopic image display device set forth in Patent Literature 1, and the back side of the image display panel increases in size for the three-dimensional stereoscopic image display device set forth in Patent Literature 2. Therefore, there is a problem that spatial and temporal limitations arise for use (utilization) of the devices.

The present invention has been made in consideration of the above circumstances, and has as its object to provide a stereoscopic image display device and a stereoscopic image display method that enable a stereoscopic image (three-dimensional image) having high image quality and containing a large amount of information to be viewed with a similar feeling to everyday life without the use of special glasses.

Solution to Problem

In order to achieve the above object, a stereoscopic image display device according to a first aspect of the present invention comprises:
a display displaying side by side a plurality of small images, each of the small images containing three-dimensional display data, to convert the three-dimensional display data into rays and output the rays from each of the small images;

first mechanical shutters being disposed in front of the display so as to correspond to positions of the small images displayed on the display, extracting the rays in a time-division manner as partial rays each output from a plurality of partial regions provided in each of the small images, and transmitting the partial rays forward; and second mechanical shutters being disposed in front of the first mechanical shutters so as to correspond to the positions of the small images displayed on the display, transmitting forward the partial rays extracted in a time-division manner per each of the small images, reconstructing the partial rays as the rays, and converging each of the reconstructed rays in front to form a three-dimensional image.

Here, the rays converted from the three-dimensional display data are the rays emitted toward various directions from each of object points (three-dimensional positions) on the surface of a three-dimensional object, containing ray route information about passing positions and directions in space and color information about the object point.

In order to achieve the above object, a stereoscopic image display method according to a second aspect of the present invention comprises steps of:

displaying side by side on a display a plurality of small images, each of the small images containing three-dimensional display data, to convert the three-dimensional display data into rays and output the rays from each of the small images;

extracting the rays in a time-division manner as partial rays each output from a plurality of partial regions provided in each of the small images and transmitting the partial rays forward by using first mechanical shutters disposed in front of the display so as to correspond to positions of the small images displayed on the display; and transmitting forward the partial rays extracted in a time-division manner per each of the small images, reconstructing the partial rays as the rays, and converging the reconstructed rays in front, by using second mechanical shutters disposed in front of the first mechanical shutters so as to correspond to positions of the small images displayed on the display, to form a three-dimensional image.

Advantageous Effects of Invention

In the stereoscopic image display device according to the first aspect of the present invention and the stereoscopic image display method according to the second aspect of the present invention, the number of the display for displaying the small images is only one, thus it is possible to make the stereoscopic image display device compact. Also, it is possible by means of the first mechanical shutters to extract at a high speed by time-dividing the rays output from the small images as the partial rays each output from the plurality of partial regions. This makes it possible to reduce the spatial and temporal limitations when using the stereoscopic image display device and when applying the stereoscopic image display method.

Also, in the stereoscopic image display device according to the first aspect of the present invention and the stereoscopic image display method according to the second aspect of the present invention, since the rays output from the small images are extracted in a time-division manner as the partial rays output from the partial regions of the small images by using the first mechanical shutters, it is possible to prevent the partial rays, which are each output from the partial regions of the small images next to each other displayed on the display, from overlapping each other in space, and it is possible to extract the partial rays not including noise content. As a result, the rays reconstructed from the partial rays also do not include noise content, and thus, this makes it possible to form a stereoscopic image without distortions.

Moreover, since the partial rays are extracted by using the first mechanical shutters, it is possible to prevent color tone changes of the partial rays and to suppress attenuation of light quantity of the partial rays, and also, since the rays are reconstructed from the partial rays by using the second mechanical shutters, it is possible to prevent color tone changes of the rays and to suppress attenuation of light quantity of the rays; therefore, a bright stereoscopic image with accurate color tone can be obtained.

DESCRIPTION OF EMBODIMENT

An embodiment of the present invention will be described next with reference to the accompanying drawings to provide an understanding of the present invention.

Figure 1:
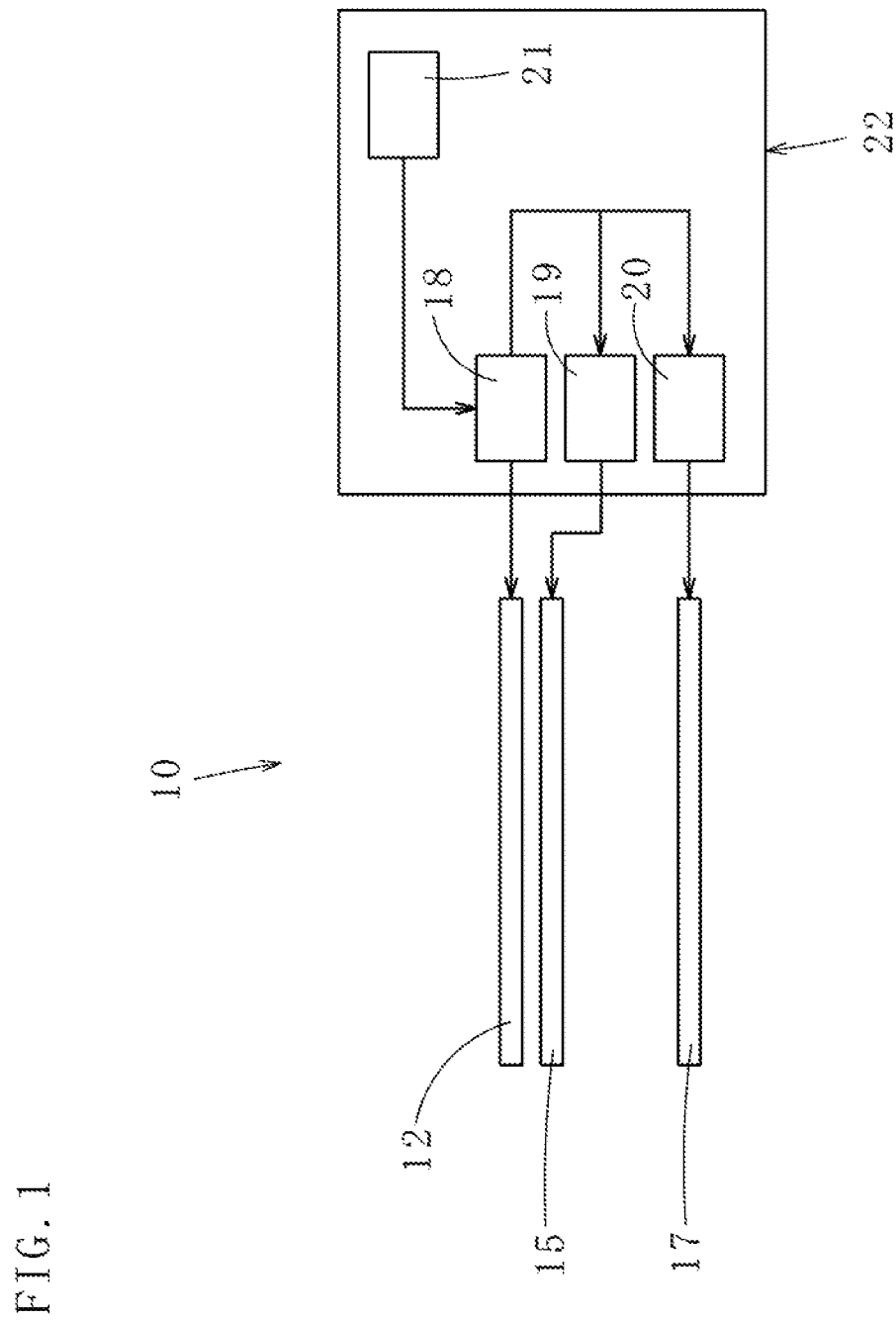
FIG. 1 is a block diagram showing a stereoscopic image display device according to an embodiment of the present invention.
Figure 2:
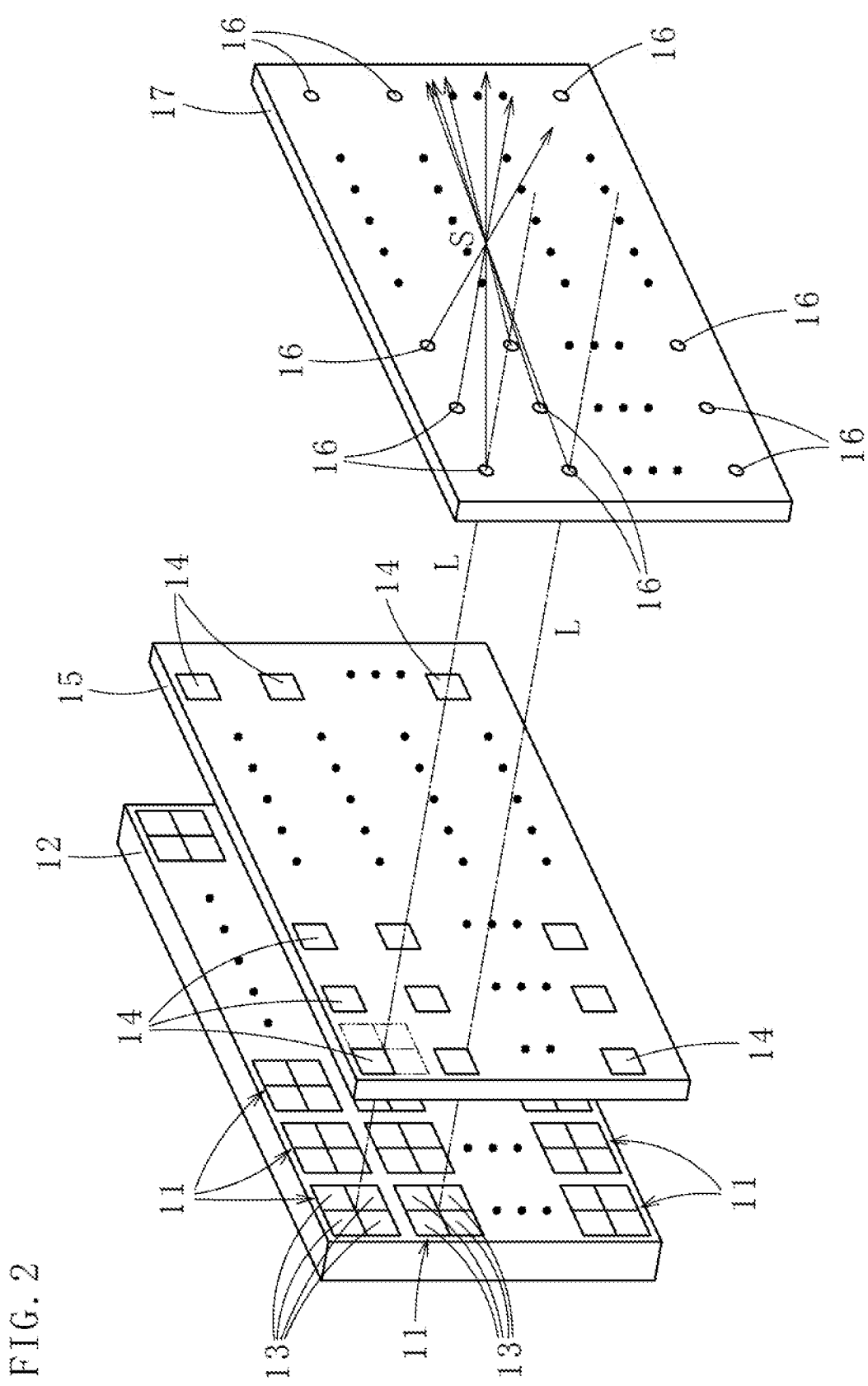
FIG. 2 is an oblique perspective figure showing a structure of the stereoscopic image display device.

As shown in FIGS. 1 and 2, a stereoscopic image display device (10) according to an embodiment of the present invention includes a display (12) displaying side by side a plurality of small images (11), each of which containing three-dimensional display data, to convert the three-dimensional display data into rays and output the rays from each of the small images (11). In each of the small images (11) a plurality of partial regions (13) are provided, and in front of the display (12) a first mechanical shutter panel (15) having first mechanical shutters (14) disposed so as to correspond to positions of the small images (11) displayed on the display (12) is provided. The first mechanical shutters (14) extract in a time-division manner the rays output from each of the small images (11) as partial rays each output from the plurality of partial regions (13) and transmit the partial rays forward. Also, in front of the first mechanical shutters (14) a second mechanical shutter panel (17) having second mechanical shutters (16) disposed so as to correspond to the positions of the small images (11) displayed on the display (12) is provided. The second mechanical shutters (16) transmit forward the partial rays extracted in a time-division manner per each of the small images (11), reconstruct the partial rays as the rays, and converge each of the reconstructed rays in front to form a stereoscopic image (three-dimensional image).

Further, the stereoscopic image display device (10) includes a control unit (22) provided with: an image displaying means (18) for displaying on the display (12) the small images (11) containing the three-dimensional display data; a first mechanical shutter operating means (19) for positioning the first mechanical shutters (14) such that the first mechanical shutters (14) correspond to the positions of the small images (11) displayed on the display (12) and performing on/off operations (open/close operations) of the first mechanical shutters (14); a second mechanical shutter operating means (20) for positioning the second mechanical shutters (16) such that a light axis L exists at a central portion of each of the small images (11) displayed on the display (12) and performing on/off operations of the second mechanical shutters (16) such that off-time (off-time: when a shutter is closed) of the second mechanical shutters (16) synchronizes with off-time of the first mechanical shutters (14); and a small image making means (21) for making the small images (11) containing the three-dimensional display data. This will be explained in details below.

The number of pixels of the display (12) is preferably equal to or more than 4,000 pixels in a transverse (horizontal) direction, and equal to or more than 2,000 pixels in a longitudinal (perpendicular) direction (i.e. it is preferable to be a display having the number of pixels of 4K or more, more preferably 8K or more). This makes it possible to display many high-definition small images (small images each containing big three-dimensional display data) side by side on the one display (12) and to form a high-resolution three-dimensional image.

The first mechanical shutters (14) are composed of a plurality of MEMS shutters (micro mechanical shutters based on Micro Electro-Mechanical System technology). This allows, for example, the MEMS shutters each having a same size as each of the pixels of the display (12) to be arranged in the first mechanical shutter panel (15) in accord with disposition of the pixels of the display (12) (to be disposed with a same density as a pixel density of the display (12)). Therefore, by selecting some of the MEMS shutters according to positions and dimensions (shapes) of the partial regions (13) provided in each of the small images (11) from the plurality of MEMS shutters disposed in the first mechanical shutter panel (15), it is possible to make the selected MEMS shutters serve as the first mechanical shutters (14) having same shapes as the partial regions (13).

The second mechanical shutters (16) are composed of a plurality of the MEMS shutters. This allows, for example, the MEMS shutters each having the same size as each of the pixels of the display (12) to be arranged in the second mechanical shutter panel (17) in accord with the disposition of the pixels of the display (12). Therefore, by selecting some of the MEMS shutters located within a range corresponding to a central portion of each of the small images (11) displayed on the display (12) from the plurality of MEMS shutters disposed in the second mechanical shutter panel (17), it is possible to make the selected MEMS shutters serve as the second mechanical shutters (16) positioned such that the light axis L passes through the central portion of each of the small images (11).

By using the first mechanical shutters (14) as optical shutters, it is possible to extract the partial rays in which the color tone changes are prevented and the attenuation of light quantity is suppressed from the rays output from each of the small images. Also, by using the second mechanical shutters (16) as the optical shutters, it is possible to transmit the partial rays toward the front of the second mechanical shutter panel (17) while preventing the color tone changes and suppressing the attenuation of light quantity. This makes it possible to reconstruct the rays in which there is no color tone change and the attenuation of light quantity is suppressed comparing to the rays output from each of the small images (11) by using the partial rays extracted from each of the small images (11), and converge each of the rays.

To accurately extract in a time-division manner the partial rays output from the partial regions (13) provided in the small images (11), it is preferable that the first mechanical shutter panel (15) be disposed so as to abut on the display (12) or closely disposed so as to have a space of equal to or less than 500 μm with respect to the display (12).

Also, a distance between the display (12) and the second mechanical shutter panel (17) is decided based on the ray route information in the three-dimensional display data contained in each of the small images (11) (such that the partial rays output from the partial regions (13) of each of the small images (11) can pass in a same manner through the second mechanical shutters (16) toward the front of the second mechanical shutter panel (17)).

Here, as shown in FIG. 2, when the second mechanical shutters (16) are on-time (on-time: when a shutter is open), one of the first mechanical shutters (14) corresponding to a position of one of the partial regions (13) selected from the plurality of partial regions (13) provided in each of the small images (11) becomes on-time. That is, each time the second mechanical shutters (16) are switched on or off, a different one of the partial regions (13) is sequentially selected from the plurality of partial regions (13) provided in each of the small images (11), and one of the first mechanical shutters (14) corresponding to the selected partial region (13) becomes on-time while synchronizing with on-time of the second mechanical shutters (16). This makes it possible to extract in a time-division manner only the partial rays of the one partial region (13) selected from the plurality of partial regions (13) provided in each of the small images (11).

Figure 3:
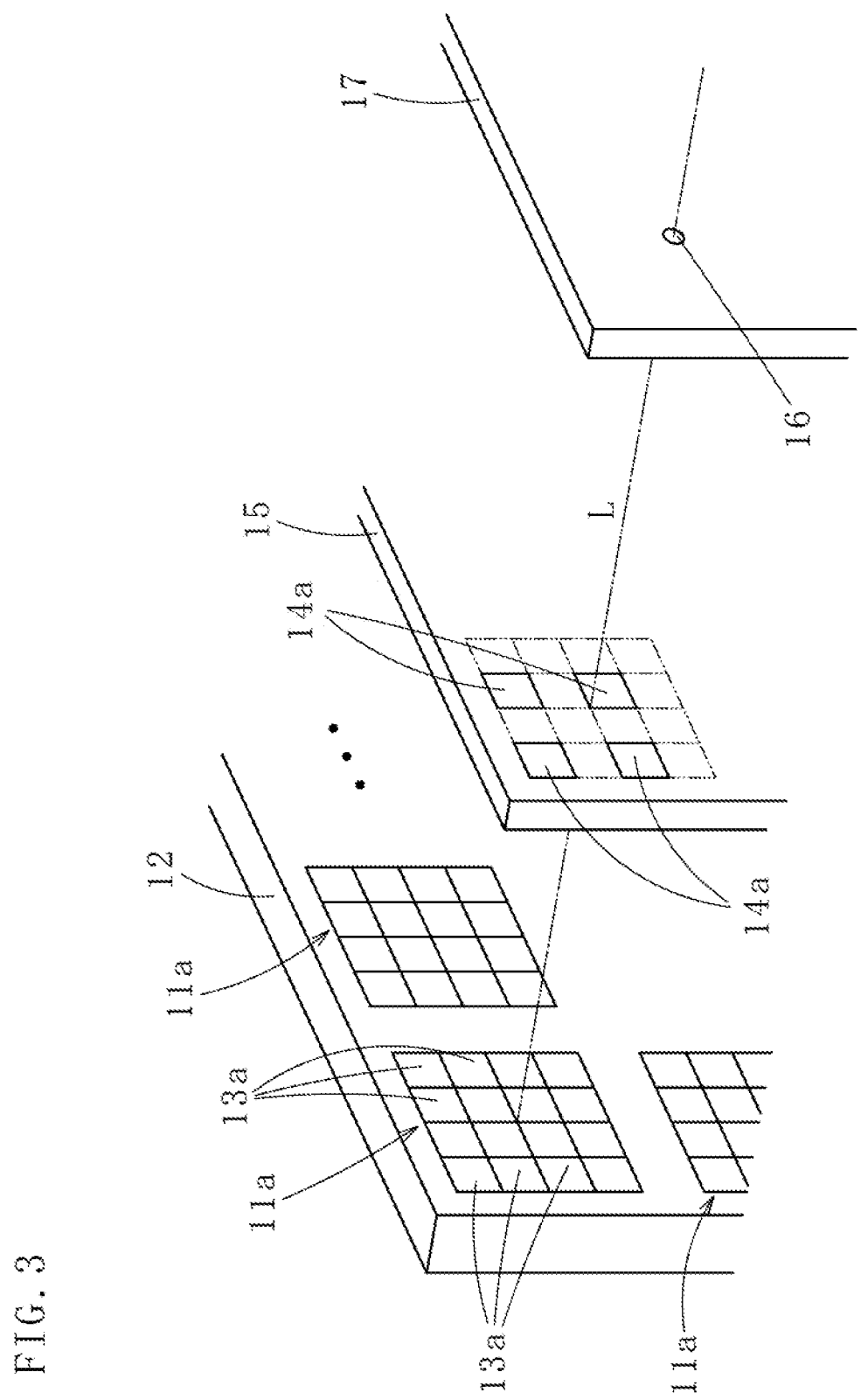
FIG. 3 is an oblique perspective figure showing another structure of the stereoscopic image display device.

Alternatively, as shown in FIG. 3, when the second mechanical shutters (16) are on-time, the first mechanical shutters (14a) corresponding to positions of a plurality (four, in FIG. 3) of the partial regions (13a) that are located at positions away from each other (for example, at least not adjacent positions) may become on-time. That is, it may be that in the same way as above, each time the second mechanical shutters (16) are switched on or off, a plurality of the first mechanical shutters (14a) located at different positions away from each other are sequentially selected, and the selected first mechanical shutters (14a) become on-time while synchronizing with on-time of the second mechanical shutters (16). In this case, it is possible to extract in a time-division manner, from the plurality of partial regions (13a) provided in each of the small images (11a), the partial rays of the simultaneously-selected two or more (four, in FIG. 3) partial regions (13a) each located at different positions. By making, in this manner, the plurality of first mechanical shutters (14a) located at positions away from each other simultaneously become on-time when the second mechanical shutters (16) are on-time, it is possible to extract the partial rays from all the partial regions (13a) within the afterimage retention time of the eye (for example, 1/60 sec to 1/30 sec) even if a large number of the partial regions (13a) are provided in each of the small images (11a).

Figure 4:
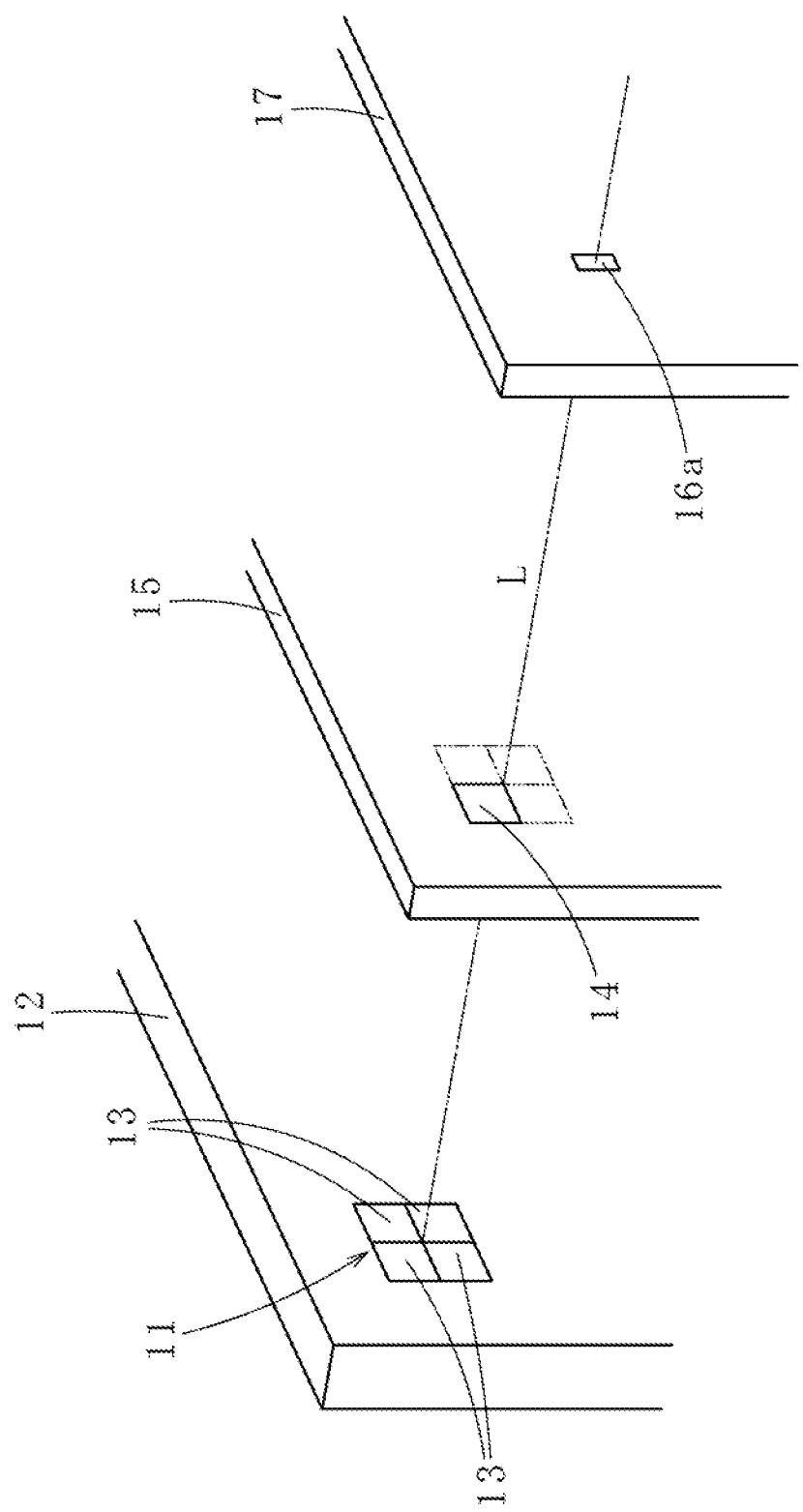
FIG. 4 is an oblique perspective figure showing still another structure of the stereoscopic image display device.

As shown in FIGS. 2 and 3, each of the second mechanical shutters (16) may be a pinhole-like state, or, as shown in FIG. 4, each of the second mechanical shutters (16a) may be a slit-like state (the light axis L passes through the central portion of each of the small images (11)).

In the case where each of the second mechanical shutters (16) is a pinhole-like state, the partial rays entered from an inlet side (the first mechanical shutter panel (15) side) of each of the second mechanical shutters (16) spread out in a light cone shape when going out from an outlet side of each of the second mechanical shutters (16) (toward the front of the second mechanical shutter panel (17)). As a result, the rays reconstructed from the partial rays also spread out in a light cone shape, and thus, a stereoscopic image having parallax information in overall directions such as horizontal, vertical, and oblique directions is formed.

Whereas, in the case where each of the second mechanical shutters (16a) is in a slit-like state, the partial rays entered from an inlet side of each of the second mechanical shutters (16a) spread out when going out from an outlet side of each of the second mechanical shutters (16a), on each of planes parallel to a width direction of the slit, in a fan shape having a base portion at the outlet side of each of the second mechanical shutters (16a).

As a result, the rays reconstructed from the partial rays also spread out in the fan shapes along the longitudinal direction of each of the second mechanical shutters (16a), and thus, a stereoscopic image having parallax information only in the width direction of the second mechanical shutters (16a) is formed. Therefore, to observe the stereoscopic image, an observer must be located such that their eyes are side-by-side along the width direction of the second mechanical shutters (16a), and thus, a limitation occurs for observing the stereoscopic image.

The image displaying means (18) of the control unit (22) is configured by loading into a computer a program, which includes a small image displaying function for reading the plurality of three-dimensional display data, converting each of the data into a signal for displaying the small images, and inputting the signals to the display (12). Incidentally, instead of loading the program into the computer, a dedicated circuit for converting the three-dimensional display data into the signals for displaying the small images may be connected to a signal input side of the display (12). By using the dedicated circuit, it is possible to increase the speed of displaying the small images.

The first mechanical shutter operating means (19) of the control unit (22) is configured by loading into a computer a program, which includes a MEMS shutter operating function for obtaining, from the image displaying means (18), positional information of pixels used for displaying each of the small images (11) displayed on the display (12) and inputting driving signals that, with respect to each of the MEMS shutters in the first mechanical shutter panel (15), turn on in a time-division manner as the first mechanical shutters (14) the plurality of MEMS shutters located within ranges each corresponding to the displaying ranges of the plurality of partial regions (13) provided in each of the small images (11) and at the same time, turn off all the rest of the MEMS shutters.

The second mechanical shutter operating means (20) of the control unit (22) is configured by loading into a computer a program, which includes a MEMS shutter operating function for obtaining, from the image displaying means (18), the positional information of the pixels used for displaying each of the small images (11) displayed on the display (12), and with respect to each of the MEMS shutters in the second mechanical shutter panel (17), turning on or off the plurality of MEMS shutters located within a range corresponding to the central portion of each of the small images (11) in synchronization with on-time and off-time of the plurality of MEMS shutters composing the first mechanical shutters (14).

The small image making means (21) of the control unit (22) is configured by loading into a computer, for example, a computer graphics function for making images of a three-dimensional object as three-dimensional display data by moving a virtual camera in a three-dimensional space.

Incidentally, it is also possible to configure the small image making means (21) by loading into a computer a function for obtaining image data by imaging through an imaging means (e.g. a stereo camera) the object to become a base of a stereoscopic image supposed to be displayed, extracting, from the image data, polygons composing a surface of the object viewed from viewpoints of the stereo camera, and obtaining, as the three-dimensional display data, vertex coordinates of the extracted polygons, connection information about the vertexes of the polygons next to each other, and color information of each of the polygons.

A stereoscopic image display method using a stereoscopic image display device (10) according to an embodiment of the present invention will be described next.

As shown in FIG. 2, the stereoscopic image display method comprises a step of displaying side by side on a display (12) a plurality of small images (11), each of which containing three-dimensional display data, to convert the three-dimensional display data into rays and output the rays from each of the small images (11); a step of extracting the rays in a time-division manner as partial rays each output from a plurality of partial regions (13) provided in the small images (11) and transmitting the partial rays toward the front of a first mechanical shutter panel (15) by using first mechanical shutters (14) disposed in front of the display (12) so as to correspond to positions of the small images (11) displayed on the display (12); and a step of transmitting the partial rays extracted in a time-division manner per each of the small images (11) toward the front of a second mechanical shutter panel (17), reconstructing the partial rays as the rays, and converging each of the reconstructed rays, by using second mechanical shutters (16) disposed in front of the first mechanical shutters (14) so as to correspond to positions of the small images (11) displayed on the display (12), to form a three-dimensional image.

Since the rays output from each of the small images (11) are extracted as the partial rays output from the partial regions (13) of each of the small images (11) by using the first mechanical shutters (14), it is possible to prevent color tone changes of the partial rays, and besides, to suppress attenuation of light quantity of the partial rays. Further, even if the small images (11) next to each other are displayed on the display (12) being closely adjacent, the partial rays output from each of the partial regions (13) of the small images (11) next to each other each have different ray routes, and thus, the partial rays never cross (overlap) each other in space. Therefore, the extracted partial rays do not include noise content.

Also, since the partial rays extracted from each of the small images (11) pass through the second mechanical shutters (16) toward the front of the second mechanical shutter panel (17), for the partial rays transmitted toward the front of the second mechanical shutter panel (17), color tone changes are prevented and attenuation of the light quantity are suppressed.

In the case of extracting in a time-division manner the partial rays each output from the plurality of partial regions (13) provided in the small images (11), the number of time-divisions, i.e. the number of the partial regions are decided in consideration of the speed of opening and closing the first mechanical shutters (14) such that the partial rays from all the partial regions can be extracted within the afterimage retention time of the eye. Also, off-time of the second mechanical shutters (16) is synchronized with off-time of the first mechanical shutters (14).

This makes it possible that, as shown in FIG. 2, all the partial rays from all the small images (11) displayed on the display (12) are extracted in front of the second mechanical shutter panel (17) within the afterimage retention time of the eye, the rays with a same quality as the rays output from each of the small images (11) (i.e. the rays in which there is no color tone change, attenuation of light quantity is suppressed, and thus, no noise content is included) are reconstructed by using the extracted partial rays, and the reconstructed rays are converged at a position S in front of the second mechanical shutter panel (17). Each of the rays, then diffuses forward after being converged at the position S, and thus, if observing each of the rays that diffuses from the front, virtual object points emitting each of the diffusing rays can be seen at the position S where each of the rays are converged. As a result, it is possible to observe in front of the second mechanical shutter panel (17) a stereoscopic image as an aggregation of the virtual object points. Incidentally, since the rays diffusing from the aggregation of the virtual object points have a same quality as the rays output from each of the small images (11), the three-dimensional image to be observed becomes a high-definition image which is bright and with no distortion.

The present invention has been described above with reference to the embodiment. However, the present invention is not limited to the structures described in the above embodiment, and includes other embodiments and modifications conceivable within the scope of the matters described in the scope of the claims.

For instance, instead of the structure where the display and the first mechanical shutter panel are disposed so as to abut on each other, it may be a structure where the display and the first mechanical shutter panel are integrated, that is, where the MEMS shutters are respectively provided on the pixels of the display and the MEMS shutters are made to serve as the first mechanical shutters. This makes it possible to precisely extract in a time-division manner the partial rays each output from the plurality of partial regions provided in the small images.

Also, although in the present invention above the stereoscopic image display device and the stereoscopic image display method are configured by using the first and second mechanical shutters (for example, the MEMS shutters), it is conceivable to use liquid crystal shutters as the first and second mechanical shutters (in this case, interpret "mechanical shutters" as "liquid crystal shutters"). However, in the current technology, the mechanical shutters have a quicker responsiveness comparing to the liquid crystal shutters and can obtain a more vivid and precise stereoscopic image.

INDUSTRIAL APPLICABILITY

It is possible to widen the application range from displaying still images to displaying moving images and contribute to the realization of a stereoscopic TV and a stereoscopic image providing service. Therefore, the present invention has applicability as a stereoscopic image display device for video game consoles and medical use, and also as a stereoscopic image display method used at video game arcades, amusement parks, movie theaters, and medical institutions.

REFERENCE SIGNS LIST

10: stereoscopic image display device, 11, 11a: small image, 12: display, 13, 13a: partial region, 14, 14a: first mechanical shutter, 15: first mechanical shutter panel, 16, 16a: second mechanical shutter, 17: second mechanical shutter panel, 18: image displaying means, 19: first mechanical shutter operating means, 20: second mechanical shutter operating means, 21: small image making means, 22: control unit

The invention claimed is:
1. A stereoscopic image display device comprising:
a display displaying side by side a plurality of small images, each of the small images containing three-dimensional display data, to convert the three-dimensional display data into rays and output the rays from each of the small images;
a first mechanical shutter panel being disposed so as to abut on the front of the display or being integrated with the display so as to be disposed on the front of the display, the first mechanical shutter panel having first micro mechanical shutters therein, each of the first micro mechanical shutters having a same size as each of pixels of the display, the first micro mechanical shutters being arranged in accord with disposition of the pixels of the display;
a second mechanical shutter panel being disposed in front of the first mechanical shutter panel with a predetermined distance therebetween, the second mechanical shutter panel having second micro mechanical shutters therein, each of the second micro mechanical shutters having the same size as each of the pixels of the display, the second micro mechanical shutters being arranged in accord with the disposition of the pixels of the display,
wherein the first mechanical shutter panel makes the first micro mechanical shutters, which are located within a range corresponding to a displaying range of one of a plurality of partial regions provided in each of the small images displayed on the display, serve as one of first mechanical shutters, and the first mechanical shutters each turn on and off in a time-division manner with respect to a corresponding one of the small images, extract the rays in a time-division manner as partial rays each output from the plurality of partial regions, and transmit the partial rays forward,
wherein the second mechanical shutter panel makes the second micro mechanical shutters, which correspond to a position of each of the small images displayed on the display, serve as one of second mechanical shutters, and each of the second mechanical shutters becomes on-time when at least one of the first mechanical shutters, which correspond to positions of the partial regions sequentially selected from the plurality of partial regions provided in a corresponding one of the small images, is on-time, and the second mechanical shutters transmit forward the partial rays extracted in a time-division manner per each of the small images, reconstruct the partial rays as the rays, and converge each of the reconstructed rays in front to form a three-dimensional image.

2. The stereoscopic image display device according to claim 1, wherein each of the second mechanical shutters respectively corresponding to the small images is disposed on a light axis passing a central portion of a corresponding one of the small images.

3. The stereoscopic image display device according to claim 1, wherein, when the second mechanical shutters respectively corresponding to the small images are on-time, one of the first mechanical shutters that corresponds to a position of one of the plurality of partial regions provided in each of the small images becomes on-time.

4. The stereoscopic image display device according to claim 1, wherein, when the second mechanical shutters respectively corresponding to the small images are on-time, the first mechanical shutters that correspond to positions of the partial regions located at positions away from each other of the plurality of partial regions provided in each of the small images, become on-time.

5. The stereoscopic image display device according to claim 1, wherein each of the second mechanical shutters is in a pinhole-like state.

6. The stereoscopic image display device according to claim 1, wherein each of the second mechanical shutters is in a slit-like state.

7. The stereoscopic image display device according to claim 1, wherein each of the first and second micro mechanical shutters is a MEMS shutter.

8. The stereoscopic image display device according to claim 1, wherein the three-dimensional display data are made from image data obtained by an imaging means.

9. The stereoscopic image display device according to claim 1, wherein the three-dimensional display data are made by using computer graphics.

10. A stereoscopic image display method comprising steps of:
 displaying side by side on a display a plurality of small images, each of the small images containing three-dimensional display data, to convert the three-dimensional display data into rays and output the rays from each of the small images;
 extracting the rays in a time-division manner as partial rays each output from a plurality of partial regions provided in each of the small images and transmitting the partial rays forward by turning on and off in a time-division manner one or more of first mechanical shutters, wherein the first mechanical shutters are arranged in a first mechanical shutter panel disposed so as to abut on the front of the display or integrated with the display so as to be disposed on the front of the display; and wherein the first mechanical shutters are respectively disposed at positions corresponding to a plurality of partial regions provided in each of the small images displayed on the display; and
 transmitting forward the partial rays extracted in a time-division manner per each of the small images, reconstructing the partial rays as the rays, and converging the reconstructed rays in front to form a three-dimensional image by making second mechanical shutters become on-time when the first mechanical shutters are on-time, wherein the second mechanical shutters are arranged in a second mechanical shutter panel disposed in front of the first mechanical shutter panel with a predetermined distance therebetween; wherein the second mechanical shutters are disposed so as to each correspond to a position of each of the small images displayed on the display; and wherein the first mechanical shutters correspond to positions of the partial regions sequentially selected from the plurality of partial regions provided in each of the small images.

* * * * *